Aug. 17, 1937.    J. L. CREVELING    2,090,111
LUBRICATING DEVICE
Filed Sept. 17, 1931    5 Sheets-Sheet 1

INVENTOR.
JOHN L. CREVELING
BY
ATTORNEY.

Aug. 17, 1937.   J. L. CREVELING   2,090,111
LUBRICATING DEVICE
Filed Sept. 17, 1931   5 Sheets-Sheet 2

INVENTOR.
JOHN L. CREVELING
BY
*John A. Watson*
ATTORNEY.

Aug. 17, 1937.   J. L. CREVELING   2,090,111
LUBRICATING DEVICE
Filed Sept. 17, 1931   5 Sheets-Sheet 3

INVENTOR.
JOHN L. CREVELING
BY John A. Watson
ATTORNEY.

Aug. 17, 1937.  J. L. CREVELING  2,090,111
LUBRICATING DEVICE
Filed Sept. 17, 1931  5 Sheets-Sheet 4

INVENTOR.
JOHN L. CREVELING
BY
ATTORNEY.

Aug. 17, 1937.  J. L. CREVELING  2,090,111
LUBRICATING DEVICE
Filed Sept. 17, 1931  5 Sheets-Sheet 5

INVENTOR.
JOHN L. CREVELING
BY John A. Watson
ATTORNEY.

Patented Aug. 17, 1937

2,090,111

UNITED STATES PATENT OFFICE 2,090,111

LUBRICATING DEVICE

John L. Creveling, Tucson, Ariz., assignor to The Lubrication Corporation, South Bend, Ind., a corporation of Delaware Application September 17, 1931, Serial No. 563,415

3 Claims. (Cl. 221—47.4)

This invention relates to lubricating devices and more particularly to containers for lubricant adapted to be used with guns or pumps for servicing lubrication fittings.

One of the objects of the invention is to provide a container for lubricant adapted to transport lubricant from the factory to the place at which it is to be supplied to lubrication fittings and adapted there to be attached to a gun or pump and to act efficiently with the gun or pump for servicing lubrication fittings.

Other objects will be apparent from a reading of the subjoined specification and claims and from a consideration of the accompanying drawings.

In order to explain the invention more clearly several embodiments thereof are shown in said drawings, in which.

In general the containers illustrated include the following features:

The provision of receptacles or containers, each adapted to be combined with a plurality of different forms of gun; closures for the ends of the containers, the closures being either formed with concentric openings or provided with concentric weakened portions through which openings may be formed; closures for the ends of the containers formed with radial grooves and ribs; followers positioned in the container at the factory when lubricant is packed therein; followers whether included at the factory or supplied later formed with concentric openings or with concentric weakened portions; and gun engaging flanges associated with the containers by which the latter are secured to and form an operative part of the gun.

Figure 1:
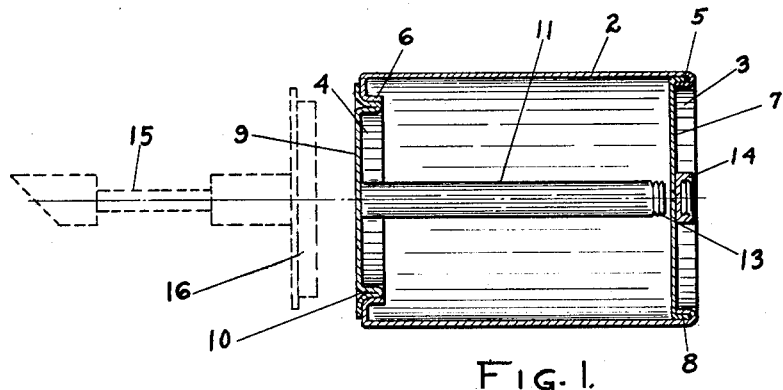
Fig. 1 is a view in section of a lubricant container adapted to be associated with gun elements for forming means for servicing lubrication fittings.

Referring particularly to Fig. 1 of the drawings, I have shown a container comprising a receptacle or cylinder 2 formed with open ends 3 and 4 and provided with flanges adjacent to each of these ends, a flange 5 being formed by a fold bent back substantially parallel to the side walls of the cylinder 2, or in other words, bent inwardly both laterally and longitudinally, and a flange 6 being formed by a fold also bent back parallel to the side walls of the cylinder 2 but spaced inwardly further from said side walls than the flange 5. Closures are formed for the openings 3 and 4, a closure for the end 3 comprising a disk 7, having a flange formed by a fold 8 bent substantially perpendicular to the main surface of the disk 7 outwardly adjacent to the circumference of the disk, the flange being normally positioned between the cylinder flange 5 and the walls of the cylinder. The closure 9 for the opening 4 comprises a disk formed with a flange 10 adjacent to the circumference thereof but spaced inwardly so that the flange 10 is able to telescope within the flange 6. Thus the flange 10 is formed of two parallel folds of the disk 9. Secured to the disk 9 in any suitable manner is a rod or stem 11 which normally extends inwardly through the lubricant.

Figure 2:
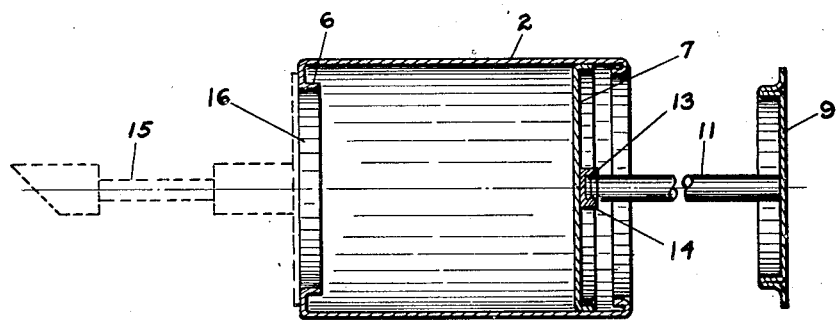
Fig. 2 is a view of the container shown in Fig. 1 after being combined with gun parts in such a manner that it is ready for operation.

As may be seen more clearly in Fig. 2, the container 2 is adapted to be combined with gun elements 15, the gun elements including a flanged closure 16 adapted to fit in the opening 4 within the flange 6. Thus it is possible to remove the closure 9 together with the rod 11 and insert in its place the closure 16 attached to the gun parts 15. Then it is possible to insert one end of the rod 11 in a pocket 13 formed in a small cap 14 soldered or otherwise suitably secured to the closure 7, and use the closure 9 as a handle to press against the rod 11 to force the closure 7 inward. Preferably the cap 14 is internally threaded so that the rod 11 may be screwed in. Thereupon the closure 7 serves as a follower or piston for forcing lubricant out of the container into the gun parts 15 from which the lubricant may be forced into fittings to be lubricated.

Figures 3, 4:
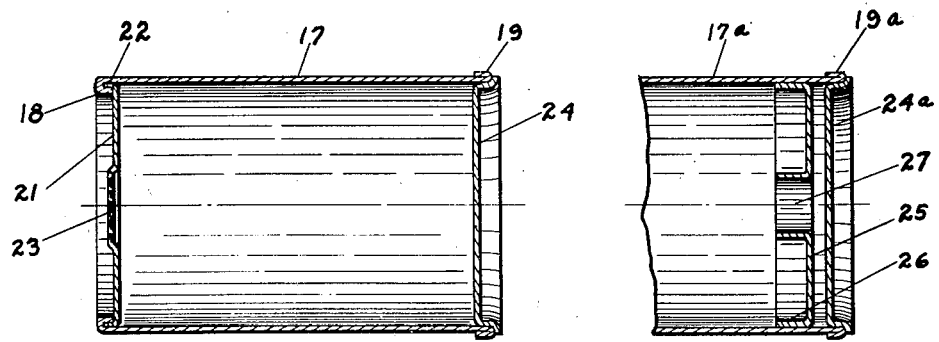
Fig. 3 is a view of a modified form of container adapted to be attached to gun parts.
Fig. 4 is a fragmentary view in section of a container somewhat similar to the container shown in Fig. 3.

In Fig. 3 I have shown a different form of container. Therein is provided a receptacle or cylinder 17 formed with an inwardly turned flange 18 similar to the flange 5 described above, and formed at its opposite end with an outwardly turned flange 19. For closing the end of the cylinder 17 adjacent to the flange 18 there is provided a disk 21 having a circumferential flange 22 which corresponds substantially to the disk 7 and the flange 8 described above. The disk 21, however, is formed with a concentric, softened, or scored knockout portion 23, which may be formed, as shown, as a circular indentation of the disk 21 concentric therewith and preferably formed of a softer metal. Thus, if the container is formed of tin, the softened portion could be formed of soft brass soldered to the closure. If desired, instead of a softened portion 23 of a different metal, there may be substituted a unitary disk closure of one metal having a scored line drawn around the portion that it is desired to knockout.

The word "knockout" used throughout the specification and claims is selected arbitrarily for lack of a better generic term, generally to describe portions of the containers and followers, etc., that are displaced or broken for purpose of access to the contents of the containers, and the word as used is intended to include portions originally integral with the containers or followers and of predetermined position that are weakened in any suitable manner relative to surrounding portions, or portions or plugs used to close a pre-formed opening but of such character that they may be broken or removed. The opposite end of the cylinder 17 is provided with a flanged disk 24 which telescopes within the cylinder 17.

In Fig. 4 there is shown a container comprising a receptacle or cylinder 17a formed at one end with a flange 19a and provided with a closure 24a, all similar to corresponding parts shown in Fig. 3. However, there is provided within the cylinder 17a, adjacent to the closure 24a, a follower 25 formed with a peripheral flange 26 pointing inwardly of the cylinder and formed with a flanged central opening 27.

Figure 5:
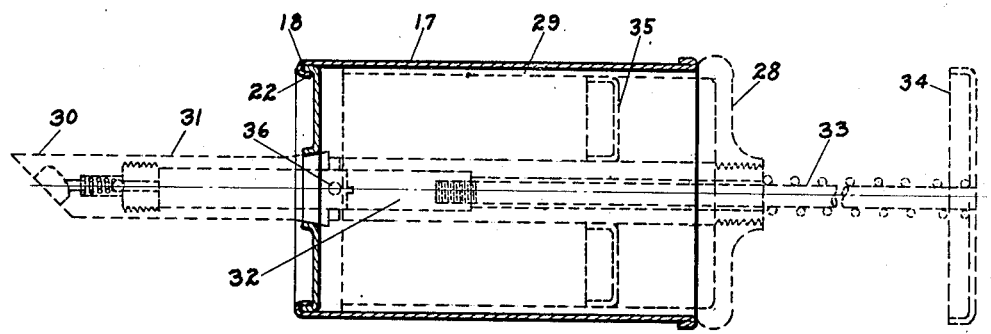
Fig. 5 is a view in section of the container illustrated in Fig. 3 after being combined with gun parts in such a manner that it is ready for operation.

In Fig. 5 there is disclosed the container shown in Fig. 3 combined with gun parts to form a gun adapted to supply lubricant. The gun parts, shown in dotted lines, comprise a cap 28 formed integrally with the cylinder side walls 29, and a gun barrel 31 provided with a sharp front end 30, a piston 32, a piston rod 33 and a handle 34.

Within the cylindrical side walls 29 there is provided a follower 35, and through the barrel 31 there is formed an inlet port 36. If desired, the follower 35 may be omitted as well as the side walls 29, whereupon the container shown in Fig. 4 should be used, thus utilizing the follower 25 and the side walls 17a. It is clear that reciprocation of the handle 34 will be effective to cause the piston 32 to draw lubricant from the cylinder 17 through the port 36 and to force the lubricant out of the gun barrel into the fitting to be lubricated.

Figure 6:
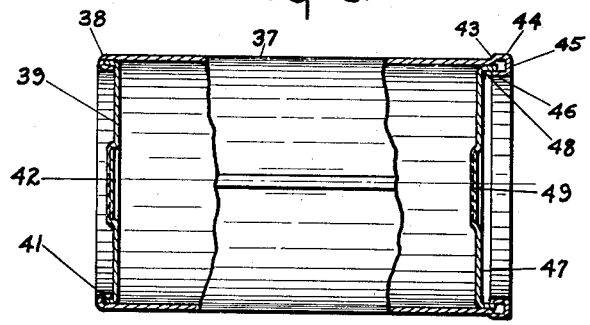
Fig. 6 is a view of another modified form of container shown with parts in elevation and with parts in section.

In Fig. 6 I have shown a still different form of container. Therein the receptacle or cylinder 37, the flange 38 and the closure 39, formed with flange 41 and knockout portion 42, correspond substantially to the cylinder 17, the flange 18 and the closure 21 shown in Fig. 3. However, the opposite end of the cylinder 37 is formed differently. Said end is formed with a fold 43 bent laterally outwardly perpendicular to the side walls, with a fold 44 bent longitudinally outwardly perpendicular to said fold 43, with a fold 45 bent laterally inwardly parallel to the fold 43 and extending inwardly beyond the side walls, and a fold 46 bent longitudinally inwardly parallel to the fold 44. Thus there is provided a flange extending outwardly from the cylinder by which the cap of a lubricant gun may be secured to the container, and there is also provided a groove inside of the cylinder in which an end closure for the cylinder may be inserted. The outwardly extending flange 44 is preferably discontinuous so that the gun may be locked thereto as by a bayonet joint. The end closure which is provided in this end of the cylinder is designated 47 and is formed with a peripheral flange 48 and a central knockout portion 49 corresponding in all respects to similar parts of closure 39. The fold 46 may extend inward only so far as the bend 43, but preferably extends in as shown so as to provide a tight seal with the closure 47. The flange 43—44—45—46 thus performs a two fold purpose of cooperating with the closure for closing the container and of cooperating with gun parts for locking the container in association therewith.

Figure 7:
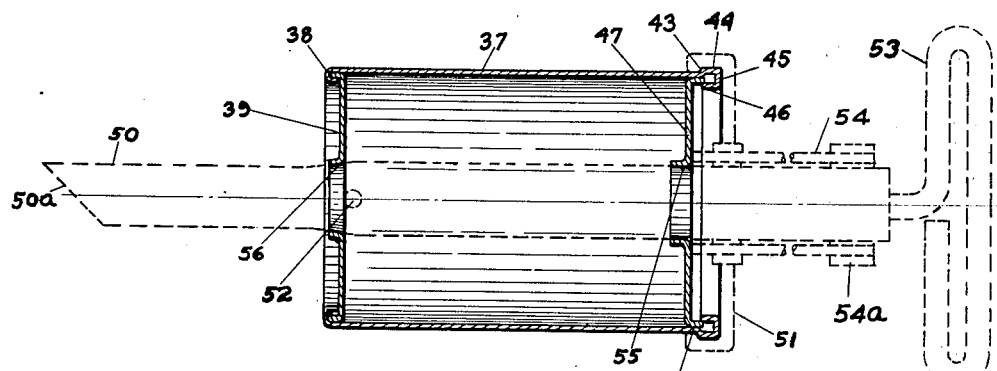
Fig. 7 is a view of the container shown in Fig. 6 after attachment with gun parts.

In Fig. 7 I have shown the container in Fig. 6 combined with gun parts to form an operative gun. To effect this combination, the sharp end 50a of the barrel 50 is pushed through the concentric knockout portions 49 and 42, thus knocking those portions out, and the cap 51 is secured over the flange formed by the folds 43, 44, 45, and 46. The barrel 50 is formed with a port 52 so that lubricant may be drawn into the gun by reciprocation of the handle 53. Rods 54 secured to a handle 54a pass through holes in the cap 51 and contact with follower 47, and thus the handle 54a serves to push the follower 47 inwardly. It is to be noted that when the knockout portions 49 and 42 are knocked out, flanges 55 and 56 are formed in the closures 47 and 39, the flanges contacting tightly with the outer surface of the barrel and preventing leakage of lubricant therearound. To aid in securing this tight joint the portions of the gun barrel adjacent to the contact with the flanges are formed with tapered shoulders.

Figure 8:
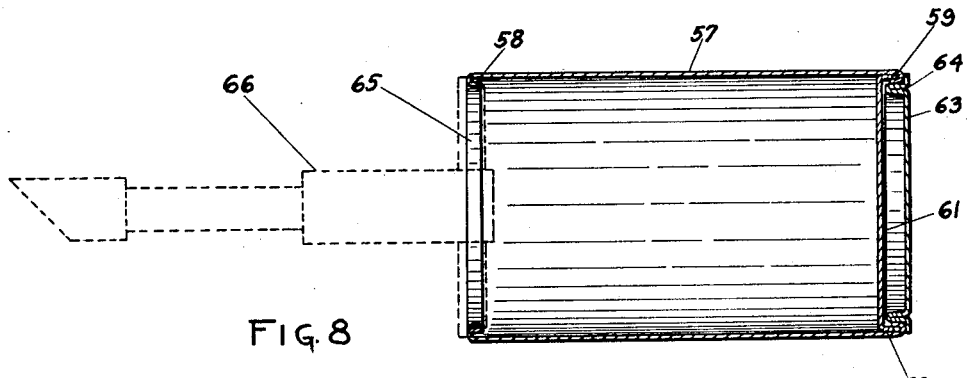
Fig. 8 is a view of a different form of container combined with a gun.

In Fig. 8 I have shown a container comprising a cylinder or receptacle 57 having both ends bent inwardly as at 58 and 59, so that inwardly turned flanges are formed, both similar to the flanges 18 and 38 in Figs. 3 and 6. For the end of the cylinder adjacent to the flange 59 there is provided a closure formed of a disk 61 having an outwardly turned flange 62, the closure thus corresponding in many respects to the closure 21 shown in Fig. 3, but not being formed with a concentric knockout portion. For the end of the cylinder adjacent to the flange 58 there is provided a closure formed of a disk 63 having an inwardly extending double flange 64 adapted to telescope within the inner surface of the flange 58. As shown in Fig. 8, the closure 63 has been removed from the end adjacent to the flange 58, and a disk 65 forming a part of a gun assembly 66 has been substituted. The gun is of the push type, and the closure 63 has been telescoped within the opposite end of the cylinder and serves as a surface against which the hand of the operator may rest in operating the gun.

Figure 9:
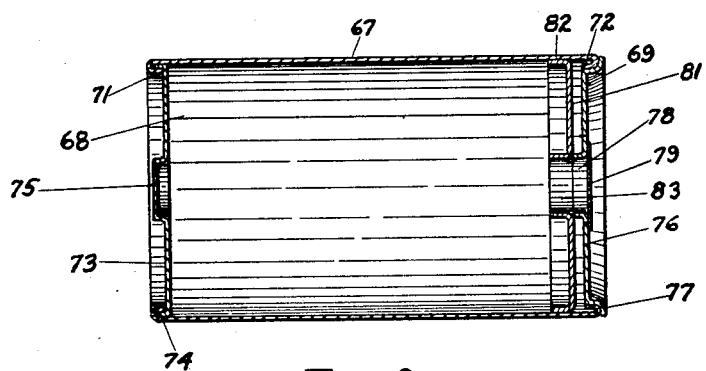
Fig. 9 is a view of a still different form of container.

In Fig. 9 is shown a container formed by a cylinder or receptacle 67 having open ends 68 and 69 formed with inturned flanges 71 and 72 which correspond to the similar flanges 58 and 59 shown in Fig. 8. The end 68 is closed by a disk 73 formed with a peripheral outwardly extending flange 74 and with a central knockout portion 75. The end 69 is closed by a disk 76 formed with a flange 77 and with a central flanged opening 78 normally closed by a removable strip 79, the closure 76 being adapted to telescope within the flange 72. Adjacent to the closure 76 there is provided a follower 81 formed with an inwardly pointing peripheral flange 82 and with a flanged central opening 83.

Figure 10:
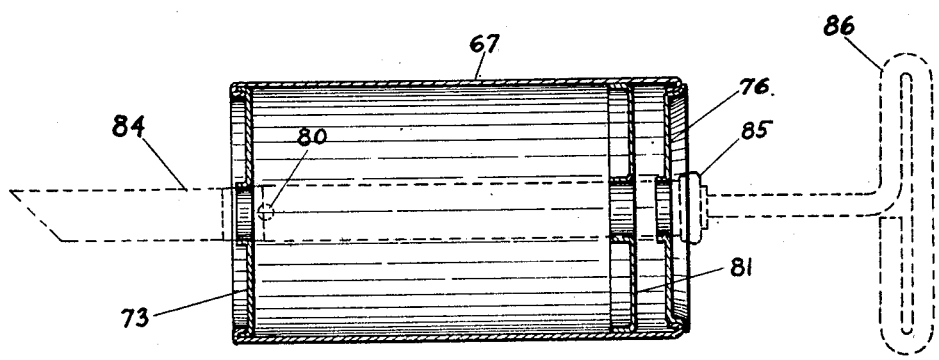
Fig. 10 is a view in section of the container shown in Fig. 9 combined with gun parts to form a gun.
Figures 11, 12:
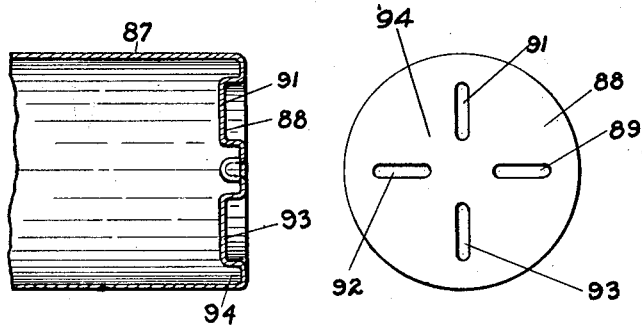
Fig. 11 is a view in section of one end of a container of modified design.
Fig. 12 is a view in bottom plan of the container shown in Fig. 11.

In Fig. 10 I have shown the container of Fig. 9 combined with gun parts to form an operative gun. Therein the soft strip 79 has been removed and the barrel 84 has been pushed through the knockout portion 75, until the collar 85 approaches but does not contact with the closure 76. Thereupon, by reciprocation of the handle 86, lubricant may be drawn into the barrel through a port 80, and forced out from the barrel into fittings to be serviced, air entering the container above the follower 81 through the opening 78. As the lubricant is drawn out from the container, the follower 81 moves to the left of the container (as shown in Fig. 10) maintaining the lubricant free of air pockets.

Figure 13:
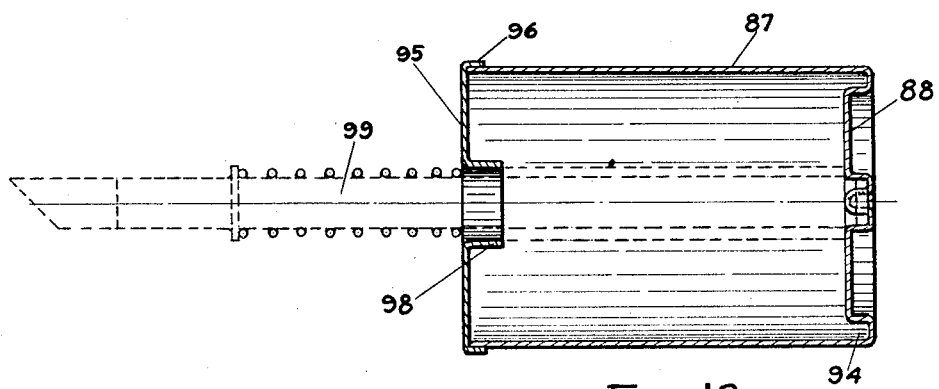
Fig. 13 is a view in section of the container illustrated in Fig. 11 when combined with gun parts to form a gun.
Figure 14:
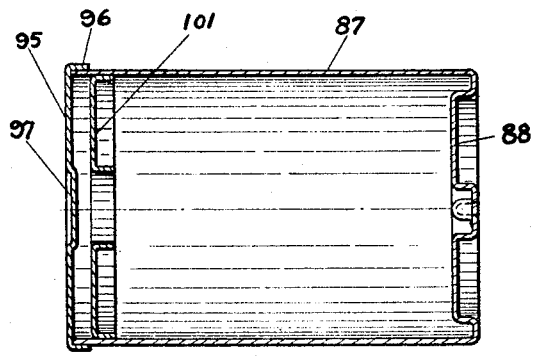
Fig. 14 is a view in section of a container of modified design somewhat similar to the container shown in Figs. 11 to 13, inclusive.

The containers shown in Figs. 11 to 14, inclusive, include a cylinder or receptacle 87 having one end closed by an integral end closure 88. The end closure 88 is formed, as is shown most clearly in Fig. 12, with a plurality of radially extending ridges 89, 91, 92, and 93. Looking at these ridges from the outside they appear as grooves, and it is clear that from the inside the portions of the closure 88 between the ridges forms radial grooves such as that indicated at 94 in which the lubricant may be collected and from which the lubricant may be drawn out by a gun. The opposite end of the cylinder 87 is closed by a disk 95 formed with a peripheral flange 96 and with a central weakened portion 97 (Fig. 14). As shown in Fig. 13, the knockout portion 97 has been knocked out to form a flanged opening 98 through which the inner end of a gun barrel 99 has been inserted to rest upon the integral closure 88. The gun barrel is formed with a telescoping sleeve whereby reciprocation of the container relative to the outer end of the gun causes the suction of lubricant into the gun and the forcing of lubricant out of the gun. As in the modification shown in Fig. 14, there may be provided, if desired, a follower 101.

Figure 15:
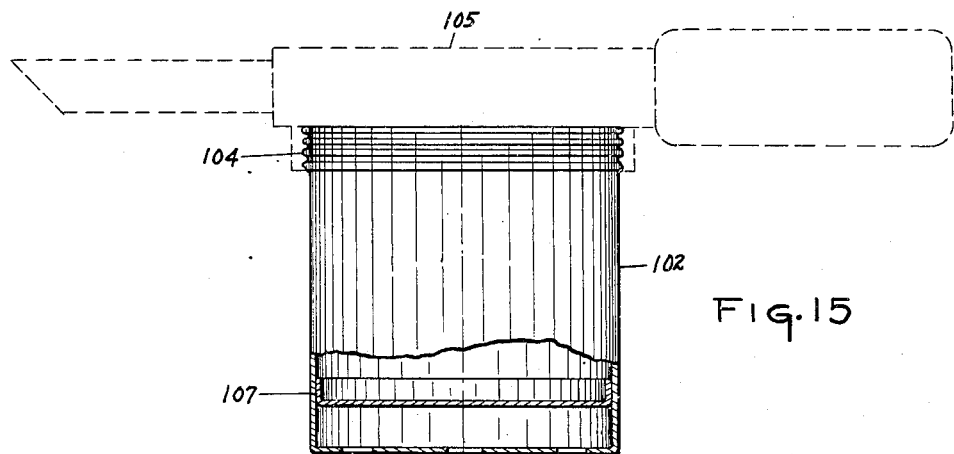
Fig. 15 is a view in elevation, with parts in section, of a container of modified design attached to gun parts to form a gun.

In Fig. 15 I have shown a container or receptacle 102, formed with an integral closure 103 for one end and having the opposite end crimped, as at 104, by which the container may be screwed on to a cooperating portion of a gun 105. The closure 103 is formed with a plurality of vents such as 106, and positioned adjacent to said closure 103 is a follower 107 which is packed in the container at the same time that the lubricant is packed therein. The follower 107 is formed of a disk having a peripheral flange with the ends pointing outwardly of the container. The gun barrel 105 has a port through which lubricant may be drawn from the container 102 into the barrel so that the lubricant may be forced out into the fitting to be serviced.

Figure 16:
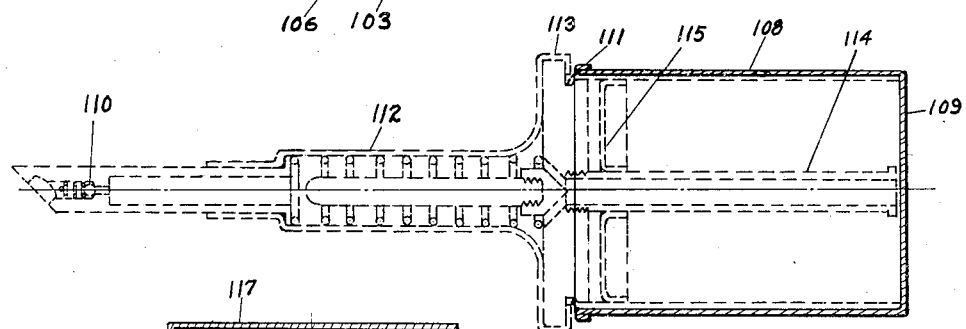
Fig. 16 is a sectional view of a still different form of container combined with gun parts to form a gun.

In Fig. 16 I have shown a container or receptacle 108 formed with an integral end closure 109 at one end and having the other end open and provided with an outwardly turned flange 111. Cooperating gun parts include the valve 110, the barrel 112, a cap 113, and an extension 114 adapted to be inserted within the container 108 may be combined with said container to form an operative gun so that lubricant may be drawn into the gun barrel from the portion of the container 108 adjacent to the end 109 and then forced out of said barrel into fittings to be serviced. A follower 115 may be associated with the gun and adapted to move down in the container as the lubricant is withdrawn.

Figure 17:
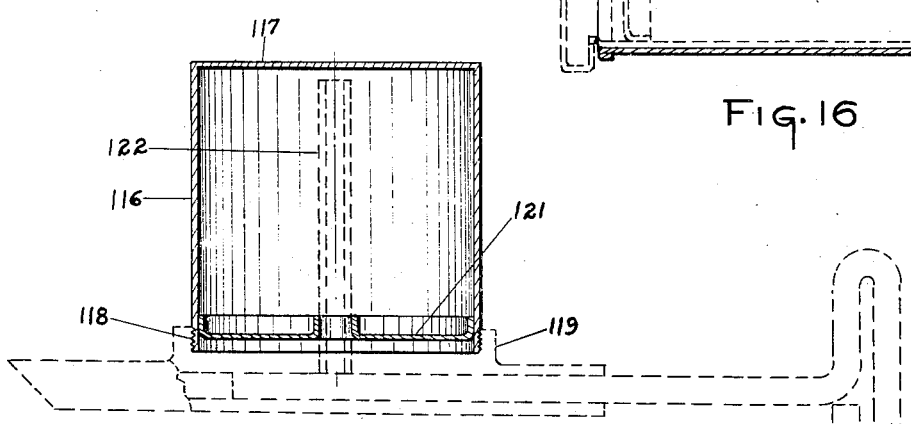
Fig. 17 is a sectional view of a still further modification combined with gun parts.

In Fig. 17 I have shown a container comprising a cylinder or receptacle 116 formed with an integral end closure 117, with screw threads 118 by which it may be attached to cooperating gun parts 119 and provided with a follower 121 packed in the container at the same time that the lubricant is packed therein. The cooperating gun parts 119 are provided with a tubular extension 122 which is adapted to extend into the cylinder 116 to withdraw lubricant from said cylinder adjacent to the closure 117. As the lubricant is withdrawn, the follower 121 moves within a cylinder toward the end 117 to prevent the formation of air pockets.

Figure 18:
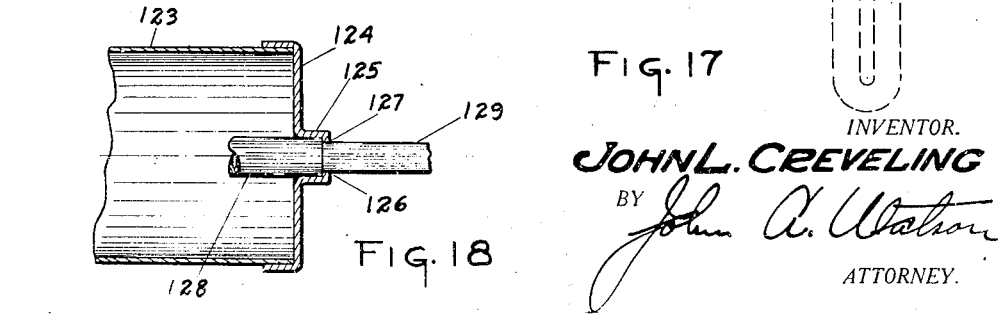
Fig. 18 is a view in section of one end of a container of modified design.

In Fig. 18 I have shown a container comprising a cylinder or receptacle 123 formed with an end closure 124, the end closure being formed with an outwardly projecting cylindrical extension 125 having its end partially closed by an integral cap 126 through which is formed a concentric opening 127. The barrel 128 of cooperating gun parts is adapted to extend within the depression formed on the inner side of the projection 125 and a plunger rod 129 is adapted to extend through and be positioned by the opening 127 in said projection.

It is to be understood that the above described embodiments of the invention are for the purpose of illustration only, and various changes may be made therein without departing from the spirit and scope of the invention.

I claim:

1. A lubricant container having a closure formed with a concentric outwardly extending indentation forming a depression on the inside and a projection on the outside, and having a concentric knock-out portion formed in said indentation, said indentation being formed with a tapered wall adapted to seal against a lubricant dispensing device.

2. A lubricant container comprising, a cylindrical body, a closure rigidly secured to one end of the body, said closure having a central outwardly extending indentation formed with tapered side walls and having its top weakened to provide a knock-out portion, a follower forming a movable closure for the opposite end of the body, said follower having a central opening alined with said indentation and defined by a circular flange.

3. A lubricant container comprising, a cylindrical body, a closure rigidly secured to one end of the body, said closure having a central outwardly extending indentation formed with tapered side walls and having its top weakened to provide a knock-out portion, a follower forming a movable closure for the opposite end of the body, said follower having a central opening alined with said indentation and defined by a circular flange, and a closure for said opposite end of the body formed with a central opening defined by a circular flange and having a knockout portion closing said last named opening.

JOHN L. CREVELING.